M. S. BROOKS.
Sleigh-Runners for Wheeled Vehicles.
No. 154,120.
Patented Aug. 18, 1874.
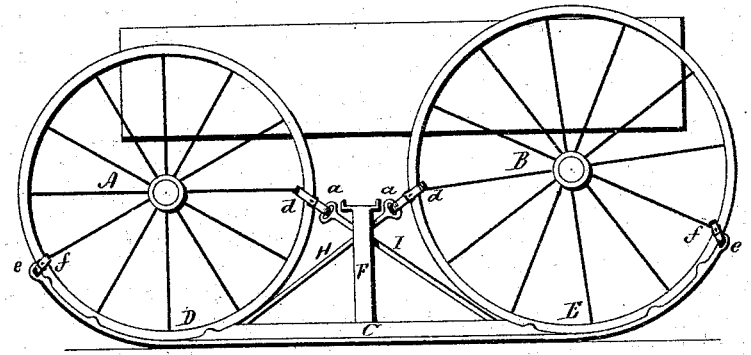

UNITED STATES PATENT OFFICE.

MERRITT S. BROOKS, OF CHESTER, CONNECTICUT.

IMPROVEMENT IN SLEIGH-RUNNERS FOR WHEELED VEHICLES.

Specification forming part of Letters Patent No. 154,120, dated August 18, 1874; application filed June 3, 1874.

*To all whom it may concern:*

Be it known that I, MERRITT S. BROOKS, of Chester, in the county of Middlesex and State of Connecticut, have invented a new Improvement in Sleigh-Runners for Wheel-Vehicles; and I do hereby declare the following, when taken in connection with the accompanying drawings and the letters of reference marked thereon, to be a full, clear, and exact description of the same, and which said drawings constitute a part of this specification, and represents a side view.

This invention relates to a device for attachment to carriage-wheels, that the vehicle may be used as a sleigh without removal from the wheels; and it consists in a runner having a seat for both the front and rear wheels and with means for attaching the same to the wheels, as more fully hereinafter described.

A is the forward wheel and B the rear wheel; C, the runner, which is formed with a seat, D, at the front end to fit the periphery of that wheel, and with a corresponding seat at the rear to fit the periphery of the rear wheel. Both the runners being alike the axles will be parallel when the wheels are in said seats. F is a vertical post between the wheels, which forms a step and also a support for the braces H J. The said braces extend from the runner up to their respective wheels and are each formed with a loop or eye at their upper end. Through this loop and around the felly, at each end, a strap, *d*, lashes the wheels to said braces. Each end of the runner is formed with a similar loop, *e*, and through these loops, by means of straps *f*, the wheels are lashed to the respective end of the runner. In this condition the vehicle is ready for use as a sleigh. The runners may be easily detached when not required for use, or, being very compact, be taken with the vehicle without inconvenience.

It will be understood that there is no direct connection between the runner of one side and the runner of the other side, each being a separate structure.

I am aware that sleigh-runners for attachment to carriage-wheels have been used, having the running-part constructed in two or more sections, jointed together; but this I do not claim. The distinctive character of my invention is to construct the runner in one piece with curved ends fitting the periphery of each wheel.

Having thus described my invention, what I claim as new, and desire to secure by Letters Patent, is—

The runner for wheel-vehicles, consisting of the curved bar C having seats D E, upright F, and braces H I, loops *a e*, and straps *d f*, all combined as specified.

MERRITT S. BROOKS.

Witnesses:
 CHARLES L. GRISWOLD,
 SOCRATES DENISON.